(12) United States Patent
Choi et al.

(10) Patent No.: US 9,519,168 B2
(45) Date of Patent: Dec. 13, 2016

(54) DISPLAY APPARATUS

(71) Applicant: SAMSUNG ELECTRONICS CO., LTD., Suwon-si (KR)

(72) Inventors: Suk-ju Choi, Jeonju-si (KR); Kye-hoon Lee, Suwon-si (KR); Yong-hun Kwon, Anyang-si (KR); Young-min Lee, Bucheon-si (KR); Kun-ho Cho, Suwon-si (KR); Gil-tae Hur, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 13/869,324

(22) Filed: Apr. 24, 2013

(65) Prior Publication Data

US 2013/0278860 A1      Oct. 24, 2013

(30) Foreign Application Priority Data

Apr. 24, 2012   (KR) ........................ 10-2012-0042795

(51) Int. Cl.
*G02F 1/1333* (2006.01)
*G02F 1/1335* (2006.01)

(52) U.S. Cl.
CPC .... *G02F 1/133308* (2013.01); *G02F 1/133603* (2013.01); *G02F 1/133608* (2013.01); *G02F 2001/133612* (2013.01); *G02F 2001/133613* (2013.01); *G02F 2001/133628* (2013.01)

(58) Field of Classification Search
CPC .............. G02F 2001/133612; G09F 2013/222
See application file for complete search history.

(56) References Cited

U.S. PATENT DOCUMENTS

| 7,920,303 | B2 | 4/2011 | Sheng |
| 7,997,749 | B2 | 8/2011 | Kim et al. |
| 8,497,638 | B2 | 7/2013 | Tanaka et al. |
| 2006/0279671 | A1 | 12/2006 | Han et al. |
| 2007/0103908 | A1 | 5/2007 | Tabito et al. |

(Continued)

FOREIGN PATENT DOCUMENTS

| CN | 1873503 A | 12/2006 |
| CN | 101826588 A | 9/2010 |

(Continued)

OTHER PUBLICATIONS

European Search Report dated Aug. 14, 2013, issued by the European Patent Office in counterpart European Application No. 13156203.5.

(Continued)

*Primary Examiner* — Paisley L Arendt
*Assistant Examiner* — Edmond Lau
(74) *Attorney, Agent, or Firm* — Sughrue Mion, PLLC (57) ABSTRACT

A display apparatus is provided. The display apparatus includes a display panel which displays an image; a top chassis and a bottom chassis which house the display panel; and a plurality of light-emitting boards which are installed on an inner surface of the bottom chassis, each of the light-emitting boards including a main printed circuit board (PCB) that extends in a longitudinal direction and light source packages installed on the main PCB, and the light source packages are arranged to be farther from a first longitudinal edge of the main PCB than a second longitudinal edge of the main PCB.

19 Claims, 8 Drawing Sheets

(56) References Cited

U.S. PATENT DOCUMENTS

| | | | |
|---|---|---|---|
| 2008/0106911 A1 | 5/2008 | Park et al. | |
| 2008/0297701 A1* | 12/2008 | Lee et al. | 349/68 |
| 2009/0068904 A1* | 3/2009 | Sato et al. | 439/892 |
| 2009/0128868 A1* | 5/2009 | Sheng | 358/509 |
| 2009/0135583 A1 | 5/2009 | Hillman et al. | |
| 2010/0220463 A1* | 9/2010 | Kim et al. | 362/97.3 |
| 2011/0050111 A1* | 3/2011 | Tanaka et al. | 315/185 R |
| 2012/0092568 A1* | 4/2012 | Yokota | 348/790 |
| 2012/0147592 A1* | 6/2012 | Takase | 362/97.1 |

FOREIGN PATENT DOCUMENTS

| | | |
|---|---|---|
| CN | 102003640 A | 4/2011 |
| DE | 102009010480 A1 | 9/2010 |
| EP | 2009487 A1 | 12/2008 |
| JP | 2005353498 A | 12/2005 |
| TW | 200922276 A | 5/2009 |

OTHER PUBLICATIONS

Communication dated Oct. 8, 2016, issued by the State Intellectual Property Office of P.R. China in counterpart Chinese application no. 201310144422.1.

* cited by examiner

DISPLAY APPARATUS

CROSS-REFERENCE TO RELATED APPLICATION(S)

This application claims priority under 35 U.S.C. §119 from Korean Patent Application No. 10-2012-0042795, filed on Apr. 24, 2012 in the Korean Intellectual Property Office, the disclosure of which is incorporated herein by reference in its entirety.

BACKGROUND

1. Field

Apparatuses, devices, and articles of manufacture consistent with exemplary embodiments relate to a display apparatus, and more particularly, to a display apparatus which includes light-emitting boards.

2. Description of the Related Art

A flat panel display has become ubiquitous. Various types of flat panel displays have been launched, and a display including a liquid crystal panel displaying an image by using light provided from the rear is one of the various types of flat panel displays.

Various methods have been used to provide light to liquid crystal panels in these types of displays. These methods include a method of directly providing light to liquid crystal panels from the rear by light sources on a printed circuit board (PCB).

In this method, the PCB may be formed of a nonmetallic material. However, a nonmetallic PCB has disadvantageous performance in terms of heat emission efficiency. If heat generated by light sources installed on the PCB is not appropriately emitted, there is a disadvantageous effect on lives of the light sources.

In general, the PCB is fixed a chassis using screws or pins and is electrically connected using a wire-harness. However, this method requires a relatively large amount of work time for installation and thus is disadvantageous in terms of productivity.

SUMMARY

Exemplary embodiments address at least the above disadvantages and other disadvantages not described above. Also, the exemplary embodiments are not required to overcome the disadvantages described above, and an exemplary embodiment may not overcome any of the disadvantages described above.

One or more exemplary embodiments provide a display apparatus which uses a plurality of light-emitting board units, improves heat emission efficiency of the light-emitting units, and provides a simple installation of the light-emitting board units.

According to an aspect of an exemplary embodiment, there is provided a display apparatus including a display panel which displays an image; a top chassis and a bottom chassis which house the display panel; and a plurality of light-emitting board units which are installed on an inner surface of the bottom chassis, each of the light-emitting board units comprising a main printed circuit board (PCB) that extends in a longitudinal direction and a plurality of light source packages installed on the main PCB, wherein the light source packages are arranged to be farther from a first longitudinal edge of the main PCB than a second longitudinal edge of the main PCB.

The main PCB may have a rectangular tape shape.

The light source package may include light source; and a first electrode and a second electrode which are spaced apart from one another in a width direction of the main PCB, wherein the light source is installed on the first electrode.

Each of the main PCBs may include a first longitudinal edge which is closer to the first electrodes than to the second electrodes; and a second longitudinal edge which is closer to the second electrodes than to the first electrodes, wherein the light source package is arranged to be closer to the second longitudinal edge than to the first longitudinal edge.

The light sources may be light-emitting diodes (LEDs).

Each of the main PCBs may include a board main body; a conductive pattern layer which is formed on an upper surface of the board main body and supplies power to the light sources; and a heat diffusion sheet which is formed on a lower surface of the board main body.

The display apparatus may further include a sub board unit which is installed on an inner surface of the bottom chassis and is electrically and physically connected to the plurality of light-emitting board units.

The plurality of light-emitting board units may each include input receptacles and output receptacles which are installed on the main PC. The sub board unit may include a sub PCB and a plurality of input plugs and a plurality of output plugs which are installed on the sub PCB. The input receptacles and the output receptacles may be respectively attached to the input plugs and the output plugs.

Each receptacle may be respectively attached to a corresponding plug through a pushing operation.

Each plug may comprise a plug body and at least one locking protrusion which protrudes from the plug body, and each receptacle may comprise a receptacle body and at least one locking groove which locks with the locking protrusions.

The locking groove may include a lock maintaining part which maintains locking of the locking protrusions and a lock releasing part which releases locking of the locking protrusions.

The plug may include a plug contact, and the receptacle may include a receptacle contact. The plug contact may contact the receptacle contact when the plug is attached to the input and output receptacle.

The bottom chassis may include hooks and the main PCBs may be hooked into the hooks through an edge of the main PCB.

The hooks may extend along the width direction of the bottom chassis.

The main PCB may be hooked to the hooks through transverse movements of the light-emitting board units.

A plurality of hooking holes may be formed in the main PCBs of the light-emitting board units. Hooks may be formed on the bottom chassis, and the main PCB may be hooked to the hooks through the plurality of hooking holes.

The plurality of hooks may extend along a longitudinal direction of the bottom chassis.

The main PCB may be hooked to the hooks through longitudinal movements of the light-emitting board units.

BRIEF DESCRIPTION OF THE DRAWINGS

The above and/or other aspects will be more apparent by describing certain exemplary embodiments with reference to the accompanying drawings, in which.

DETAILED DESCRIPTION

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
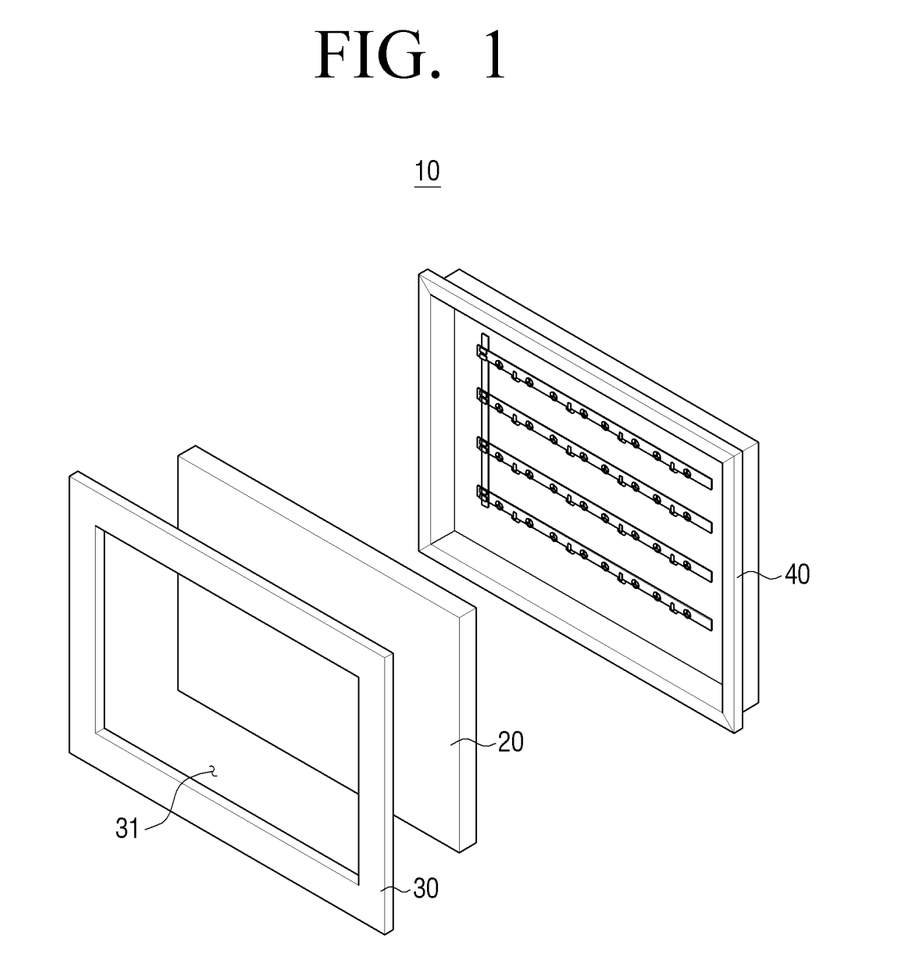
FIG. 1 is a schematic exploded perspective view of a display apparatus according to an exemplary embodiment.

FIG. 1 is a schematic exploded perspective view of a display apparatus according to an exemplary embodiment.

Referring to FIG. 1, a display apparatus 10 includes a display panel 20, a top chassis 30, and a bottom chassis 40.

The display panel 20 is a liquid crystal panel and displays a color image by using light provided from a light source package 120 which will be described later. For this purpose, the display panel 20 includes a color filter board (not shown) having a color filter layer, a thin film transistor (TFT) board (not shown) having a TFT, and a liquid crystal (not shown) disposed between the color filter board and the TFT board. The display panel 20 is known, and thus its detailed description will be omitted.

The top chassis 30 and the bottom chassis 40 house the display panel 20 and other parts (not shown) of the display apparatus 10 such as an optical film, etc.

The top chassis 30 covers a front surface of the display apparatus 10 and has an opening 31 for displaying an image. The top chassis 30 has an approximately rectangular plate shape and may be attached to the bottom chassis 40 through combination means (not shown) such as screws.

The bottom chassis 40 has an approximately rectangular box shape and provides an internal space of the display apparatus 10. Although not shown in the drawings, various types of circuit boards of the display apparatus 10, e.g., a main board (image board), a power board, a T-con board, etc., are installed on a back surface (an outer surface) of the bottom chassis 40.

Figure 2:
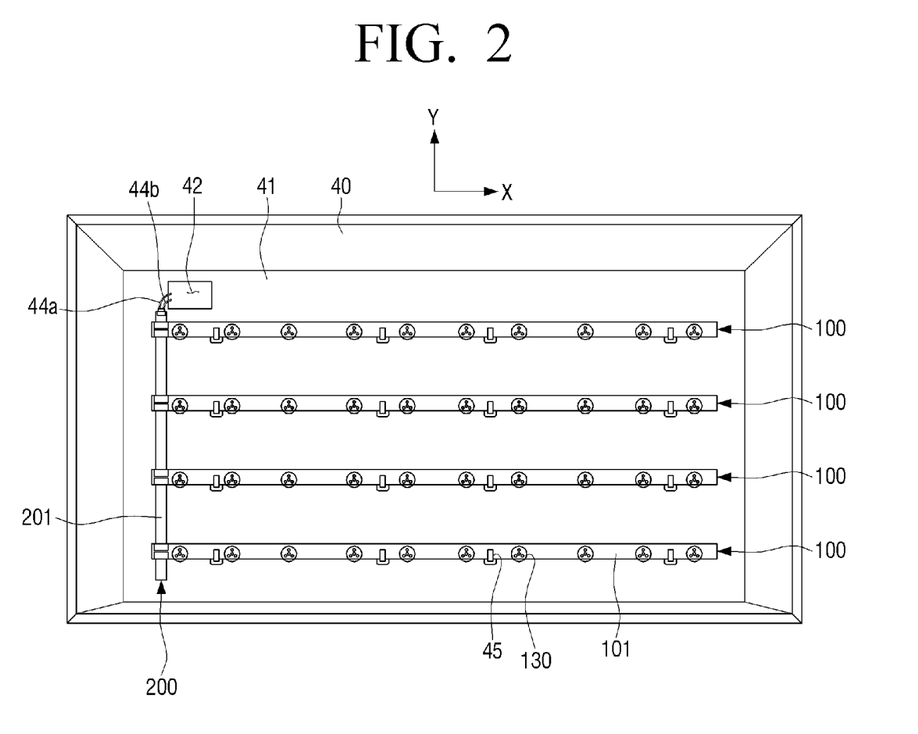
FIG. 2 is a schematic plan view of a bottom chassis of the display apparatus of FIG. 1.

Although not shown in FIGS. 1 and 2, the display apparatus 10 further includes front and back frames which form an appearance thereof. The front and back frames house the liquid crystal panel 20, the top chassis 30, and the bottom chassis 40 to support and protect various types of parts of the display apparatus 10.

FIG. 2 is a schematic plan view of the bottom chassis of the display apparatus of FIG. 1.

Referring to FIG. 2, the bottom chassis 40 includes a plurality of light-emitting board units 100 and a sub board unit 200 that are installed on an inner surface 41 of the bottom chassis 40. Here, the light-emitting board units 100 are to provide light to the display panel 20, and the sub board unit 200 is to transmit power, which is supplied from the power board (not shown), to the light-emitting board units 100.

The light-emitting board units 100 respectively include main PCBs 101, and the sub board unit 200 includes a sub PCB 201. The main PCBs 101 and the sub PCB 201 commonly have long rectangular tape shapes. The main PCBs 101 are arranged in a row along a longitudinal direction (an X direction) of the bottom chassis 40, and the sub PCB 201 is arranged to be perpendicular to the main PCBs 101 along a width direction (Y direction) of the bottom chassis 40. However, this arrangement is only an example, and the X and Y directions may be alternatively arranged as long as the sub-board unit 200 may supply power to the light emitting board units 100.

A wire guiding hole 42 is formed at a corner of the bottom chassis 40. A pair of wires, i.e., a first wire 44a and a second wire 44b, pass through the wire guiding hole 42 to connect the power board (not shown) to the sub board unit 200.

Four light-emitting board units 100 are installed in the bottom chassis 40 in the exemplary embodiment of FIG. 2, but this is only an example. The number of light-emitting board units 100 may be more or less than four.

Figure 3:
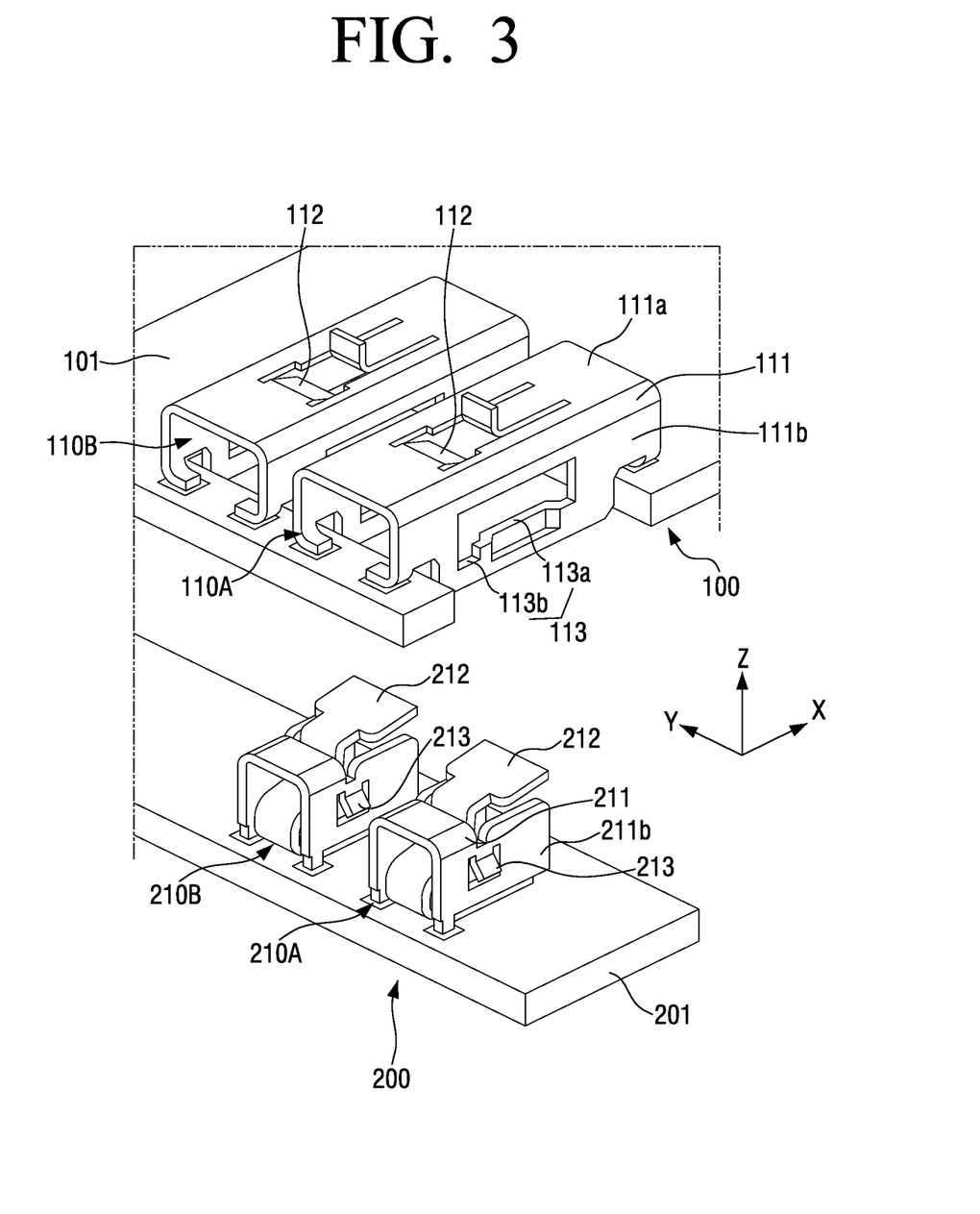
FIG. 3 is a perspective view illustrating receptacles of light-emitting board units and plugs of a sub board unit.

FIG. 3 is a perspective view illustrating receptacles of a light-emitting board unit and plugs of a sub board unit.

Referring to FIG. 3, a pair of receptacles, i.e., an input receptacle 110A and an output receptacle 110B, are installed in an end of a main PCB 101 of a light-emitting board unit 100. Also, a pair of plugs, i.e., an input plug 210A and an output plug 210B, are installed on a PCB 201 of a sub board unit 200.

The input receptacle 110A has a receptacle body 111 which has three opening sides (i.e., front, back, and bottom opening sides) and an approximately rectangular parallelepiped shape. A receptacle contact 112 is formed at an upper side 111a of the receptacle body 111. Also, locking grooves 113 are respectively formed in both sides 111b of the receptacle body 111 which are parallel with each other. Each of the locking grooves 113 includes a lock maintaining part 113a which extends in a longitudinal direction (X direction) of the receptacle body 111 and a lock releasing part 113b which is formed at an end of the lock maintaining part 113a. Here, the lock releasing parts 113b extend downwards more than the lock maintaining parts 113a, i.e., in Z direction, and thus have higher heights than the lock maintaining parts 113a.

A structure of the output receptacle 110B is to same as a structure of the input receptacle 110A, and thus a description of the structure of the output receptacle 110B will be omitted.

The input plug 210A has a plug body 211. The plug body 211 has an approximately rectangular parallelepiped shape and is of a size to be inserted into the receptacle body 111. The input plug 210 has a plug contact 212 which contacts the receptacle contact 112. Locking protrusions 213 respectively protrude from both sides 211b of the plug body 211 which are parallel with each other. The locking protrusions 213 are locked into the receptacle body 111 through the locking grooves 113 of the input receptacle 110A.

A structure of the output plug 210B is to the same as a structure of the input plug 210A, and thus a description of the structure of the output plug 210B will be omitted.

The light-emitting board unit 100 and the sub board unit 200 are arranged so as to dispose the input receptacles 110A and the output receptacles 110B on the input plugs 210A and the output plugs 210B respectively corresponding to the input receptacles 110A and the output receptacles 110B, and the light-emitting board unit 100 is pressed toward the sub board unit 200. In this case, the input receptacles 110A and the output receptacles 110B of the light-emitting board unit 100 are attached to the input plugs 210A and the output plugs 210B. The input receptacles 110A and the output receptacles 110B are electrically connected to the input plugs 210A and the output plugs 210B through a contact between the receptacle contact 112 and the plug contact 212.

As described above, the main PCB 101 and the sub PCB 201 may be electrically connected to each other in a relatively simple method through a combination between the input receptacles 110A and the output receptacles 110B and the input plugs 210A and the output plugs 210B. Therefore, work and productivity properties may be more improved in a job of connecting a plurality of main PCBs 101 to a power board than in related art methods using a wire-harness.

A locking state and a releasing state between the input receptacles 110A and the output receptacles 110B and the input plugs 210A and the output plugs 210B will be described in more detail with reference to FIGS. 4A and 4B.

Figure 4A:
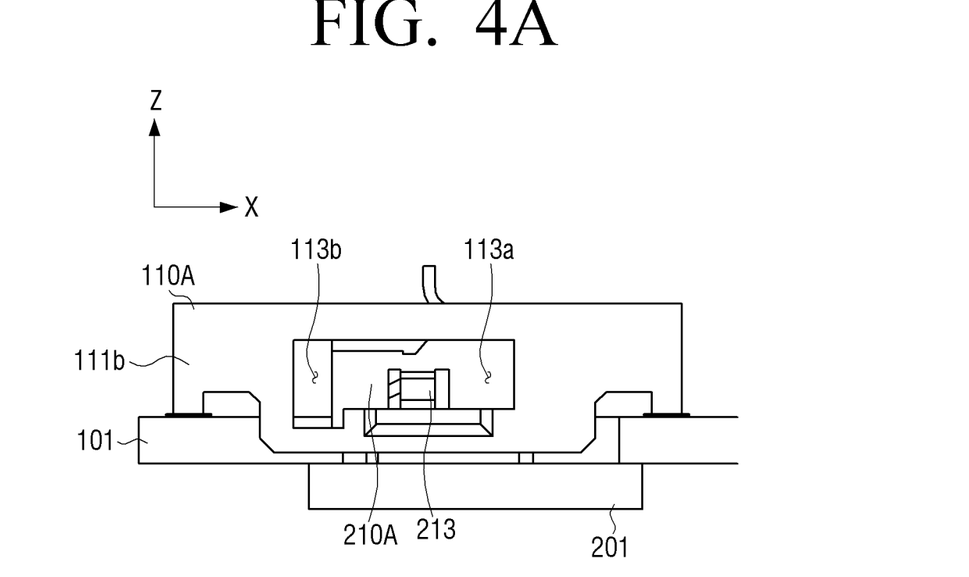
FIG. 4A is a plan view illustrating a locking state between a receptacle of a light-emitting board unit and a plug of a sub board unit.

FIG. 4A is a plan view illustrating a locking state between the input receptacles 110A and the output receptacles 110B of the light-emitting board unit 100 and the input plugs 210A and the output plugs 210B of the sub board unit 200. FIG. 4B is a plan view illustrating a releasing state between the input receptacles 110A and the output receptacles 110B of the light-emitting board unit 100 and the input plugs 210A and the output plugs 210B of the sub board unit 200.

As described above, the light-emitting board unit 100 is pressed toward the sub board unit 200 to lock the input receptacles 110A and the output receptacles 110B of the light-emitting board unit 100 with the input plugs 210A and the output plugs 210B respectively corresponding to the input receptacles 110A and the output receptacles 110B. In this case, as shown in FIG. 4A, the locking protrusion 213 of the input plug 210A is disposed in the lock maintaining part 113a of the locking groove 113 of the input receptacle 110A. In this state, the locking protrusion 213 of the input plug 210A may be locked into a side surface of the input receptacle 110A. Referring to FIG. 3 again, a part of the receptacle body 111 positioned underneath the lock maintaining part 113a is formed to be concave inwards to enable locking of the locking protrusion 213.

Figure 4B:
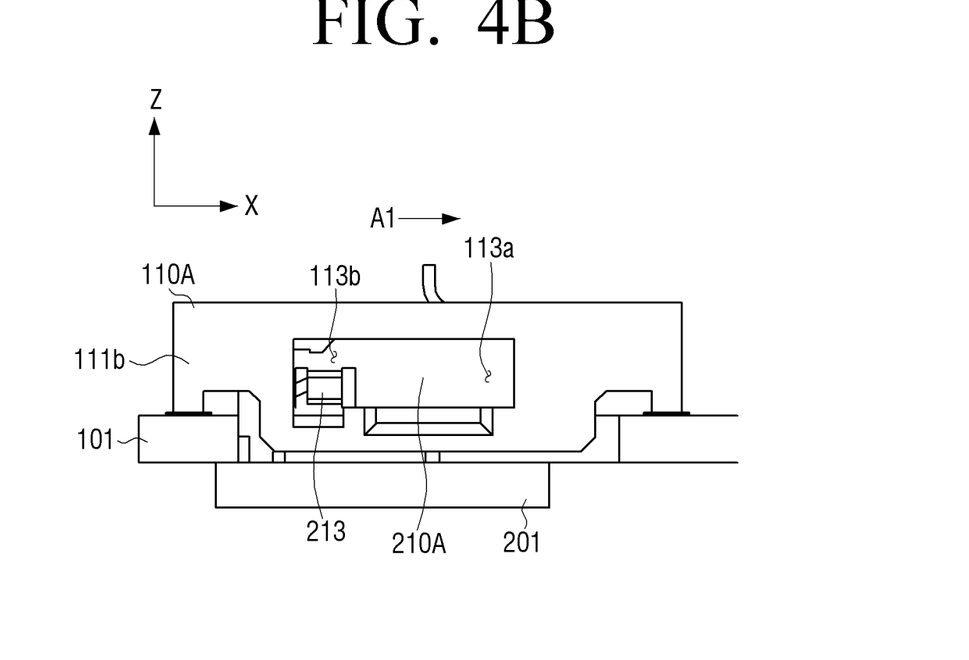
FIG. 4B is a plan view illustrating a releasing state between the receptacle of the light-emitting board unit and the plug of the sub board unit.

Referring to FIG. 4B, if the lock between the light-emitting board unit 100 and the sub board unit 200 is to be released, the input receptacle 110A is moved by the user in direction A1 along the X direction. In this case, after the movement, the locking protrusion 213 of the input plug 210A is disposed at the lock releasing part 113b of the locking groove 113, and thus the locking protrusion 213 is released from the input receptacle 110A. If the user raises the input receptacle 110A in this state, the input receptacle 110A and the input plug 210A may be separated from each other.

The above described light-emitting board unit 110 will be described in more detail with reference to FIGS. 5 through 7.

Figure 5:
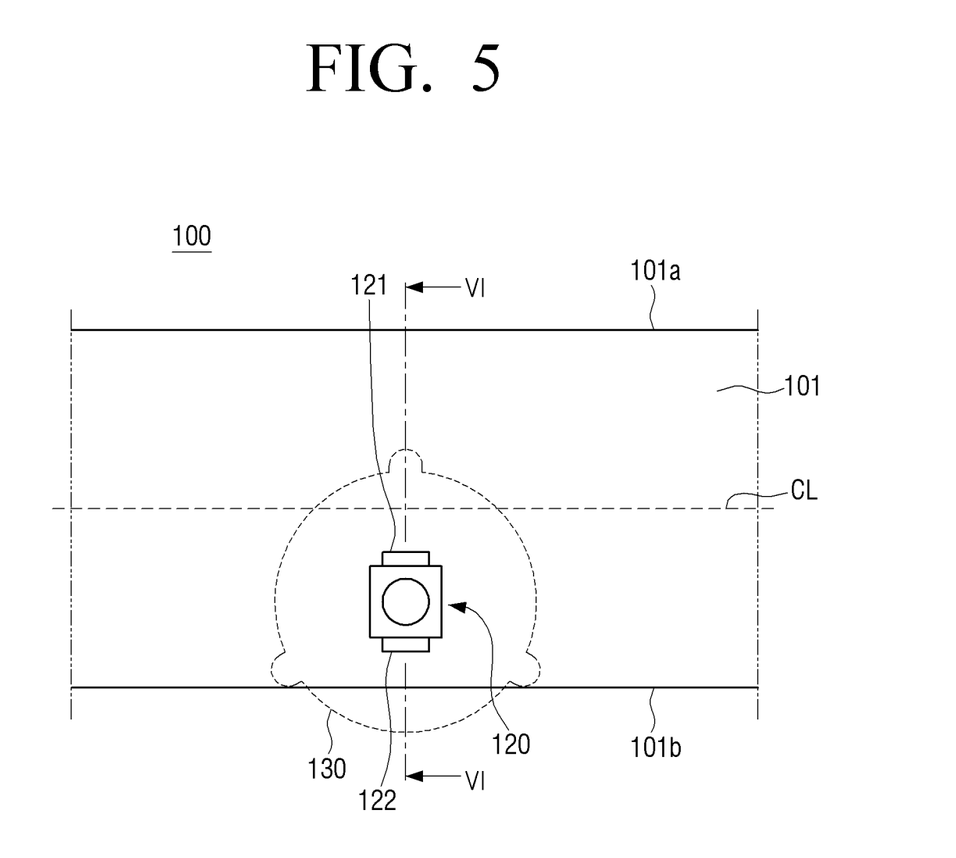
FIG. 5 is an enlarged plan view illustrating a part of a light-emitting board unit.

FIG. 5 is an enlarged plan view illustrating a part of the light-emitting board unit 100. Here, for the convenience of description, an optical lens is illustrated with a dotted line.

Referring to FIG. 5, the light-emitting board unit 100 includes a plurality of light source packages 120 and a plurality of optical lenses 130 which are installed on the above-described main PCB 101 having a long tape shape (see also, FIG. 2).

The plurality of light source packages 120 are arranged to be spaced apart from one another along a longitudinal direction (i.e., an X direction) of the main PCB 101. The plurality of optical lenses 130 are arranged to respectively cover the light source packages 130. The arrangement of the optical lenses 130 is as shown in FIG. 2. The optical lenses 130 widely spread lights emitted from the light source packages 120 in order to allow light having uniform brightness to be incident over the display panel 20 of FIG. 1.

As shown in FIG. 5, the main PCB 101 has two longitudinal edges, i.e., a first longitudinal edge 101a and a second longitudinal edge 101b, and each of the light source packages 120 includes a first electrode 121 such as a cathode and a second electrode 122 such as an anode which are spaced apart from each other in a width direction of the main PCB 101. Here, the first longitudinal edge 101a may be defined as an edge which is disposed closer to the first electrode 121 than to the second electrode 122. Also, the second longitudinal edge 101b may be defined as an edge which is disposed closer to the second electrode 122 than to the first electrode 121.

The light source packages 120 are arranged to be closer to one of the first longitudinal edge 101a and the second longitudinal edge 101b of the main PCB 101. In more detail, each light source package 120 is arranged to be closer to the second longitudinal edge 101b of the first longitudinal edge 101a and the second longitudinal edge 101b of the main PCB 101. In other words, each light source package 120 is not arranged on a horizontal central line CL of the main PCB 101 but is shifted by a distance from the horizontal central line CL toward the second longitudinal edge 101b. In other words, the light source package 120 is arranged between the horizontal central line CL and the second longitudinal edge 101b. This arrangement of the light source packages 120 is to further effectively emit heat generated by the light source packages 120, and its detailed descriptions will be described later.

Figure 6:
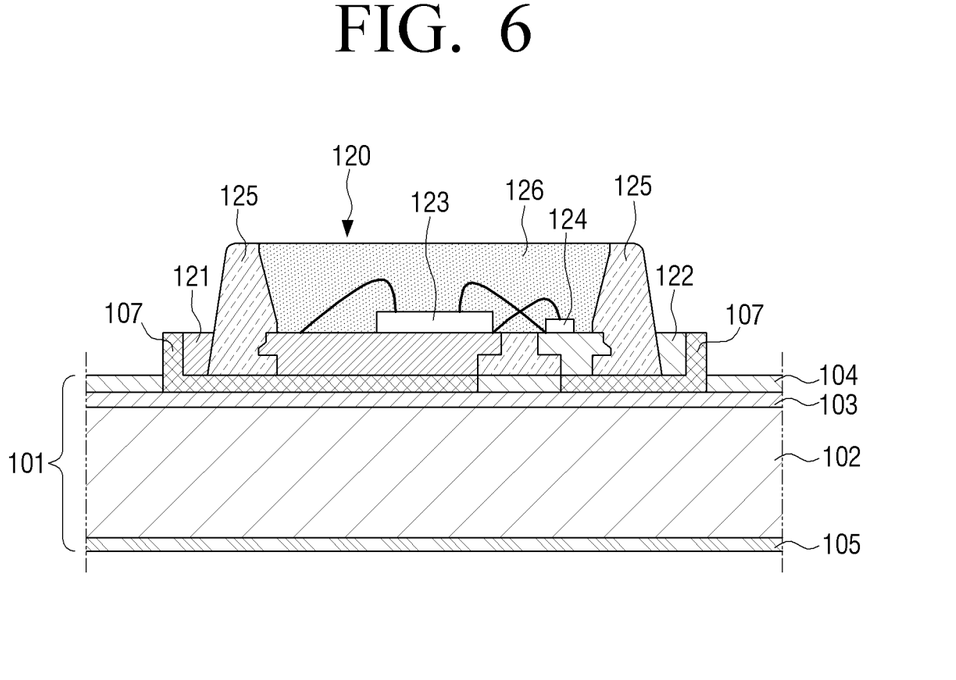
FIG. 6 is a cross-sectional view which is taken along line VI-VI of FIG. 5 and from which an optical lens is omitted.

FIG. 6 is a cross-sectional view which is taken along line VI-VI of FIG. 5 and from which the optical lenses 130 are omitted.

Referring to FIG. 6, the main PCB 101 includes a board main body 102, a conductive pattern layer 103, and a heat diffusion sheet 105.

The board main body 102 is a substrate and may be formed of CEM3. The conductive pattern layer 103 and an insulating layer 104 are sequentially formed on an upper surface of the board main body 102, and the heat diffusion sheet 105 is formed on a lower surface of the board main body 102.

The conductive pattern layer 103 may be electrically connected to the input receptacles 110A and the output receptacles 110B of FIG. 3 and the light source packages 120 to supply power to the light source packages 120. The conductive pattern layer 103 may be formed of copper (Cu). The insulating layer 104 prevents an unnecessary exposure of the conductive pattern layer 103.

The heat diffusion sheet 105 may be formed of a material having a high heat diffusion function, e.g., graphite. The heat generated by the light source packages 120 may be emitted toward the bottom chassis 40 through the conductive pattern layer 103, the board main body 102, and the heat diffusion sheet 105, and then may be discharged to the outside through the bottom chassis 40. The bottom chassis 40 may be formed of metal such as stainless steel to smoothly discharge heat.

The light source packages 120 are installed on the main PCB 101 through soldering 107. The light source package 120 includes the first electrode 121 and the second electrode 122, a light source 123, a zener diode 124, a frame 125, and a fluorescent substance 126.

The light source 123 is a light generating part and may be a light-emitting diode (LED) in the present exemplary embodiment. The light source 123 is installed on the first electrode 121 and is electrically connected to the first electrode 121 and the second electrode 122 through wires. The first electrode 121 and the second electrode 122 are partially housed in the frame 125 and are partially exposed outside the frame 125.

Figure 7:
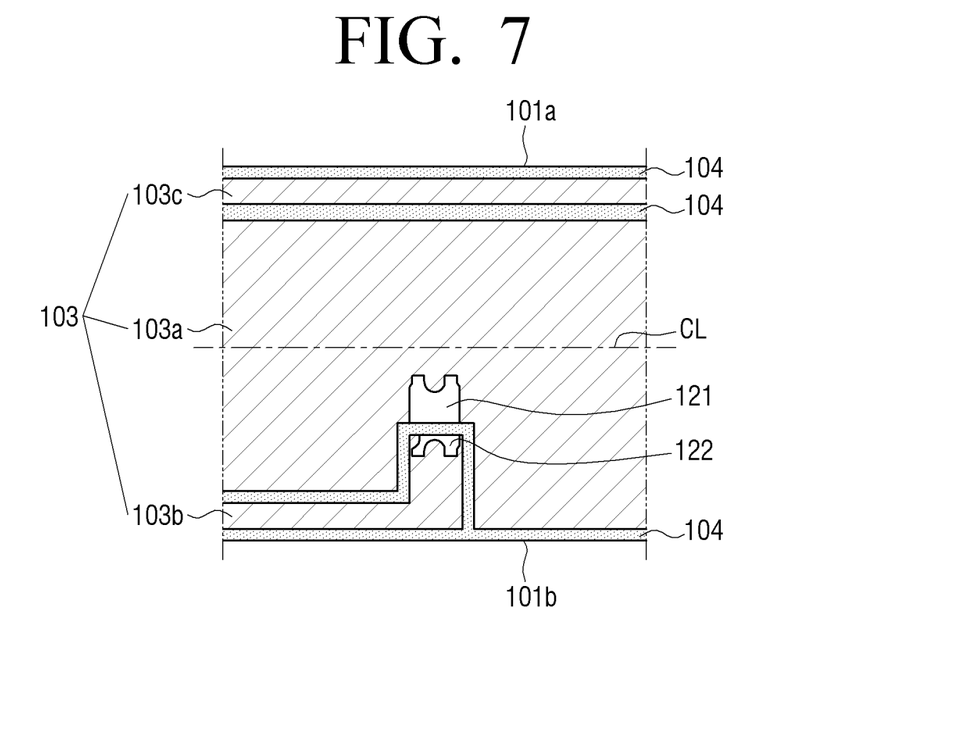
FIG. 7 is a detailed plan view illustrating a structure of a conductive pattern layer of a main printed circuit board (PCB)

FIG. 7 is a detailed plan view illustrating a structure of the conductive pattern layer 103 of the main PCB 101.

Referring to FIG. 7, the conductive pattern layer 103 includes a first region 103a, a second region 103b, and a third region 103c. Here, the first region 103a is a part which contacts the first electrode 121 of the light source package 120. The second region 103b is a part which contacts the second electrode 122 of the light source package 120. The third region 103c is a part which is to electrically connect an innermost part of the light source package 120 to the output receptacle 110B of FIG. 3.

As described above, the light source 123 is installed on the first electrode 121, and thus a temperature around the first electrode 121 is higher than a temperature around the second electrode 122 within the light source package 120. Based on this, in order to emit heat from the light source package 120, an area of the first region 103a contacting the first electrode 121 is much larger than an area of the second region 103b contacting the second electrode 122.

In terms of heat emission efficiency of the light source package 120, the area of the first region 103a is to be much larger than the area of the second region 103b. Based on this point, in order to maximize the heat emission efficiency of the light source package 120, the light source package 120 is arranged to be closer to the second longitudinal edge 101b than to the first longitudinal edge 101a of the main PCB 101 as described above with reference to FIG. 5. In other words, the light source package 120 is not positioned on the central line CL of the main PCB 101 but is shifted by a distance toward the second longitudinal edge 101b.

Figure 8:
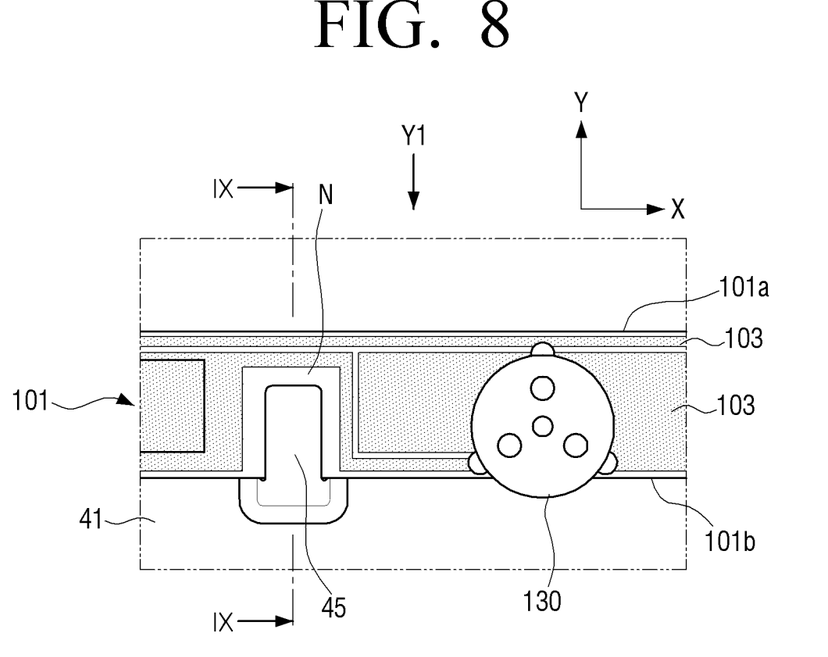
FIG. 8 is a plan view illustrating attachment between a hook of a bottom chassis and the main PCB according to an exemplary embodiment.
Figure 9:
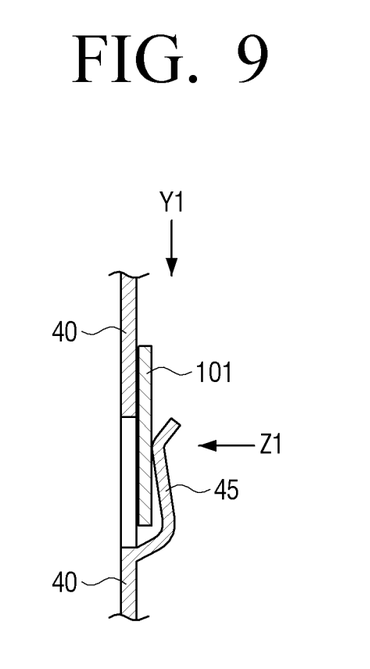
FIG. 9 is a cross-sectional view taken along line IX-IX of FIG. 8.

FIG. 8 is a plan view illustrating a combination between hooks of the bottom chassis 40 and the main PCB 101. FIG. 9 is a cross-sectional view taken along line IX-IX of FIG. 8. For the convenience of description, the insulating layer 104 formed on the conductive pattern layer 103 is omitted in FIG. 8.

Referring to FIGS. 8 and 9, a plurality of hooks 45 are formed on the inner surface 41 of the bottom chassis 40 to extend along a width direction (a Y direction) of the bottom chassis 40. The plurality of hooks 45 are arranged along the longitudinal direction (the X direction) of the bottom chassis 40, and the arrangement of the hooks 45 is as shown in FIG. 2.

If the user slides the main PCB 101 toward the hooks 45 in a transverse direction (Y1 direction), the hooks 45 are hooked to the main PCB 101 through the longitudinal edge 101b of the main PCB 101. Therefore, the main PCB 101 may be relatively simply installed on the bottom chassis 40. The hooks 45 may apply an elastic force in a Z1 direction (refer to FIG. 9) when being hooked to the main PCB 101. Therefore, fixing of the main PCB 101 onto the bottom chassis 40 may be firmly maintained.

As described above, the installation of the main PCB 101 onto the bottom chassis 40 is performed without additional attaching fixtures such as screws or pins. Also, the main PCB 101 is completely installed on the bottom chassis 40 through a one-time operation of sliding the main PCB 101 toward the hooks 45. Therefore, productivity may be more considerably improved than a related art method of installing the main PCB 101 on the bottom chassis 40 by using additional attaching fixtures such as screws or pins.

Referring to FIG. 8, the conductive pattern layer 103 is not formed in an area of the main PCB 101 into which the hook 45 is hooked. Hereinafter, this area will be referred to as a non-patterned part N. In more detail, the non-patterned part N has a slightly larger area than an area of the hook 45 hooked to the main PCB 101. The main PCB 101 has the non-patterned part N to prevent an unnecessary electric connection between the conductive pattern layer 103 and the bottom chassis 40 even if the insulating layer 104 of FIG. 6 is stripped due to friction between the hook 45 and the main PCB 101. In contrast to this, if the conductive pattern layer 103 is electrically connected to the bottom chassis 40, it is possible that there may be difficulty in lighting a light source.

Figure 10:
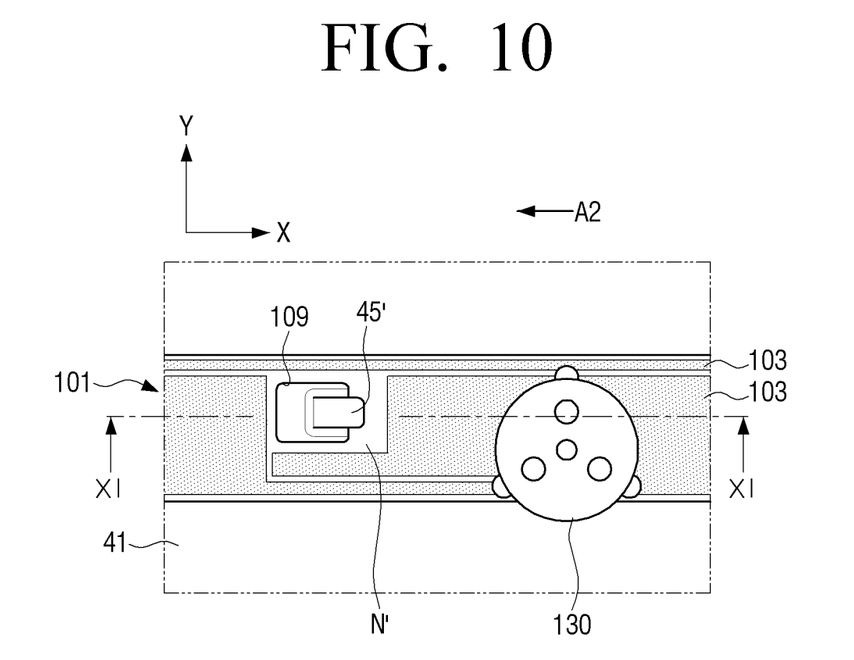
FIG. 10 is a plan view illustrating an alternative attachment between the hook of the bottom chassis and the main PCB according to another exemplary embodiment.
Figure 11:
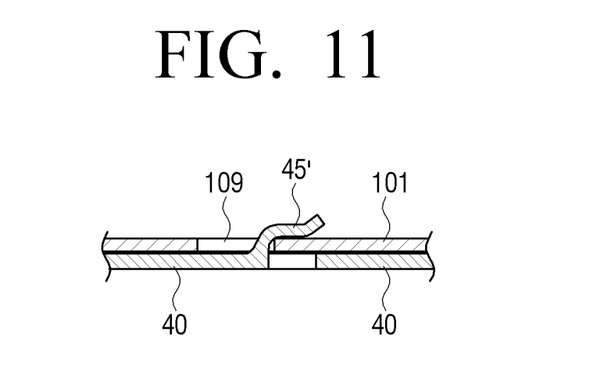
FIG. 11 is a cross-sectional view taken along line X1-X1 of FIG. 10.

FIG. 10 is a plan view illustrating an alternative combination between a hook of the bottom chassis 40 and the main PCB. FIG. 11 is a cross-sectional view taken along line X1-X1 of FIG. 10. For the convenience of description, the insulating layer 104 formed on the conductive pattern layer 103 is omitted in FIG. 10.

Referring to FIGS. 10 and 11, another type of hook 45' is formed on the inner surface 41 of the bottom chassis 40. The hooks 45' extend along the longitudinal direction (the X direction) of the bottom chassis 40 differently from the hooks 45. Hooking holes 109 are formed in the main PCB 101 to help hooking of the hooks 45' and respectively correspond to the hooks 45'.

The bottom chassis 40 and the main PCB 101 are arranged to arrange the hooks 45' corresponding to the hooking holes 109. Thereafter, if the main PCB 101 slides in direction A2, the hooks 45' are hooked to the main PCB 101, thereby achieving an installation of the main PCB 101 on the bottom chassis 40. This attachment method is also performed without additional attachment fixtures such as screws or pins and thus contribute to productivity compared to the related art attachment method.

Referring to FIG. 10, non-patterned parts N' that do not have the conductive pattern layer 103 are formed around the hooking holes 109 of the main PCB 101. As described above, the main PCB 101 has the non-patterned parts N' to prevent an unnecessary electric connection between the conductive pattern layer 103 and the bottom chassis 40 even if the insulating layer 104 of FIG. 6 is stripped due to friction between the hooks 45' and the main PCB 101.

The foregoing exemplary embodiments and advantages are merely exemplary and are not to be construed as limiting. The present inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display panel which displays an image;
a top chassis and a bottom chassis which house the display panel; and
a plurality of light-emitting board units which are installed on an inner surface of the bottom chassis, each of the light-emitting board units comprising a main printed circuit board (PCB) and a plurality of light source packages installed on the main PCB,
wherein the main PCB comprises a conductive pattern layer to supply power to the plurality of light source packages,
wherein the conductive pattern layer comprises a first region and a second region, and an area of the first region is larger than an area of the second region,
wherein each of the light source packages comprises a light source, a first electrode, and a second electrode spaced apart from the first electrode in a width direction of the main PCB, and the light source is installed on the first electrode,
wherein the first region contacts the first electrode of a light source package and the second region contacts the second electrode of the light source package, and
wherein the second region is entirely separated from the first region by an insulation layer.

2. The display apparatus of claim 1, wherein the light source packages are arranged to be farther from a first longitudinal edge of the main PCB than a second longitudinal edge of the main PCB.

3. The display apparatus of claim 2, wherein the first longitudinal edge of the main PCB is closer to the first electrodes than to the second electrodes; and
the second longitudinal edge of the main PCB is closer to the second electrodes than to the first electrodes,
wherein the light source package is arranged to be closer to the second longitudinal edge than to the first longitudinal edge.

4. The display apparatus of claim 2, wherein the light sources are light-emitting diodes (LEDs).

5. The display apparatus of claim 2, wherein the main PCB comprises:
a board main body;
and
a heat diffusion sheet which is formed on a lower surface of the board main body,
wherein the conductive pattern layer is formed on an upper surface of the board main body.

6. The display apparatus of claim 1, further comprising:
a sub board unit which is installed on the inner surface of the bottom chassis and is electrically and physically connected to the plurality of light-emitting board units.

7. The display apparatus of claim 6, wherein:
each of the light-emitting board units further comprises an input receptacle and an output receptacle which are installed on the main PCB; and
the sub board unit comprises a sub PCB, and a plurality of input plugs and a plurality of output plugs which are installed on the sub PCB,
wherein the input receptacles of the light-emitting board units are attached to respective ones of the plurality of input plugs, and the output receptacles of the light-emitting board units are attached to respective ones of the plurality of output plugs.

8. The display apparatus of claim 7, wherein each input receptacle is attached to the respective input plug through a pushing operation, and each output receptacle is attached to the respective output plug through a pushing operation.

9. The display apparatus of claim 8, wherein:
each of the input and output plugs comprises a plug body and at least one locking protrusion which protrudes from the plug body; and
each of the input and output receptacles comprises a receptacle body and at least one locking groove which locks with the locking protrusions.

10. The display apparatus of claim 9, wherein each of the locking grooves comprises:
a lock maintaining part which maintains locking of the locking protrusions; and
a lock releasing part which releases locking of the locking protrusions.

11. The display apparatus of claim 7, wherein each of the input and output plugs comprises a plug contact, and each of the input and output receptacles comprises a receptacle contact,
wherein the plug contacts contact the receptacle contacts when the plugs are attached to the receptacles.

12. The display apparatus of claim 1, wherein the bottom chassis comprises a plurality of hooks, and the main PCBs are hooked to the hooks.

13. The display apparatus of claim 12, wherein the hooks extend along a width direction of the bottom chassis.

14. The display apparatus of claim 13, wherein the main PCBs are hooked to the hooks through transverse movements of the light-emitting board units.

15. The display apparatus of claim 12, wherein each of the main PCBs comprises a plurality of hooking holes, and the main PCBs are hooked to the hooks through the plurality of hooking holes.

16. The display apparatus of claim 15, wherein the plurality of hooks extend along the longitudinal direction of the bottom chassis.

17. The display apparatus of claim 16, wherein the main PCBs are hooked to the hooks through longitudinal movements of the light-emitting board units.

18. A display apparatus comprising:
a display panel which displays an image;
a top chassis and a bottom chassis which house the display panel, the bottom chassis comprising a plurality of hooks attached to an inner surface thereof;
a plurality of main printed circuit board (PCB) units that extend in a longitudinal direction and which are detachably hooked into the plurality of hooks to mount the main PCB units to the bottom chassis, each of the main PCB units comprising a plurality of light source packages that emit light onto a rear of the display panel; and
a sub-PCB that is detachably electrically and physically installed across the plurality of main PCB units and that provides power to the plurality of main PCB units,
wherein each of the plurality of hooks is formed in a single body with the bottom chassis,
wherein the main PCB comprises a conductive pattern layer to supply power to the plurality of light source packages,
wherein the conductive pattern layer comprises a first region and a second region, and an area of the first region is larger than an area of the second region, wherein each of the light source packages comprises a light source, a first electrode, and a second electrode spaced apart from the first electrode in a width direction of the main PCB, and the light source is installed on the first electrode, wherein the first region contacts the first electrode of a light source package and the second region contacts the second electrode of the light source package, wherein the second region is entirely separated from the first region by an insulation layer.

19. The display apparatus according to claim 18, wherein each of the main PCBs comprises a receptacle, the sub-PCB comprises a plurality of plugs corresponding in number to the number of receptacles on the main PCBs, and each plug electrically connect to and physically snaps into a corresponding one of the receptacles in order to detachably electrically and physically connect the sub-PCB to the plurality of main PCBs units.

* * * * *